(12) United States Patent
Schonberger et al.

(10) Patent No.: US 11,145,083 B2
(45) Date of Patent: Oct. 12, 2021

(54) IMAGE-BASED LOCALIZATION

(71) Applicant: Microsoft Technology Licensing, LLC, Redmond, WA (US)

(72) Inventors: Johannes Lutz Schonberger, Zurich (CH); Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/418,670

(22) Filed: May 21, 2019

(65) Prior Publication Data

US 2020/0372672 A1 Nov. 26, 2020

(51) Int. Cl.
*G06T 7/73* (2017.01)

(52) U.S. Cl.
CPC ...... *G06T 7/74* (2017.01); *G06T 2207/30244* (2013.01)

(58) Field of Classification Search
CPC .................. G06T 2207/30244; G06T 7/74
See application file for complete search history.

(56) References Cited

U.S. PATENT DOCUMENTS

| 10,839,556 | B2* | 11/2020 | Sinha | ............... | G06K 9/6211 |
| 2014/0064601 | A1* | 3/2014 | Ramachandran | ...... | B25J 9/1697 |
| | | | | | 382/153 |
| 2016/0379092 | A1* | 12/2016 | Kutliroff | ............ | G06K 9/00664 |
| | | | | | 382/158 |
| 2020/0005486 | A1* | 1/2020 | Sinha | ................ | G06T 7/74 |

OTHER PUBLICATIONS

Deretey, et al., "Visual Indoor Positioning with a Single Camera Using PnP", In Proceedings of International Conference on Indoor Positioning and Indoor Navigation, Oct. 13, 2015, 9 Pages.
Jaramillo, et al., "6-DoF Pose Localization in 3D Point-Cloud Dense Maps Using a Monocular Camera", In Proceedings of IEEE International Conference on Robotics and Biomimetics, Dec. 12, 2013, pp. 1747-1752.
"International Search Report and Written Opinion Issued in PCT Application No. PCT/US2020/024766", dated Jul. 13, 2020, 11 Pages.

* cited by examiner

*Primary Examiner* — Shefali D Goradia
(74) *Attorney, Agent, or Firm* — Alleman Hall Creasman & Tuttle LLP

(57) ABSTRACT

A method for image-based localization includes, at a camera device, capturing a plurality of images of a real-world environment. A first set of image features are detected in a first image of the plurality of images. Before additional sets of image features are detected in other images of the plurality, the first set of image features is transmitted to a remote device configured to estimate a pose of the camera device based on image features detected in the plurality of images. As the additional sets of image features are detected in the other images of the plurality, the additional sets of image features are transmitted to the remote device. An estimated pose of the camera device is received from the remote device.

18 Claims, 6 Drawing Sheets

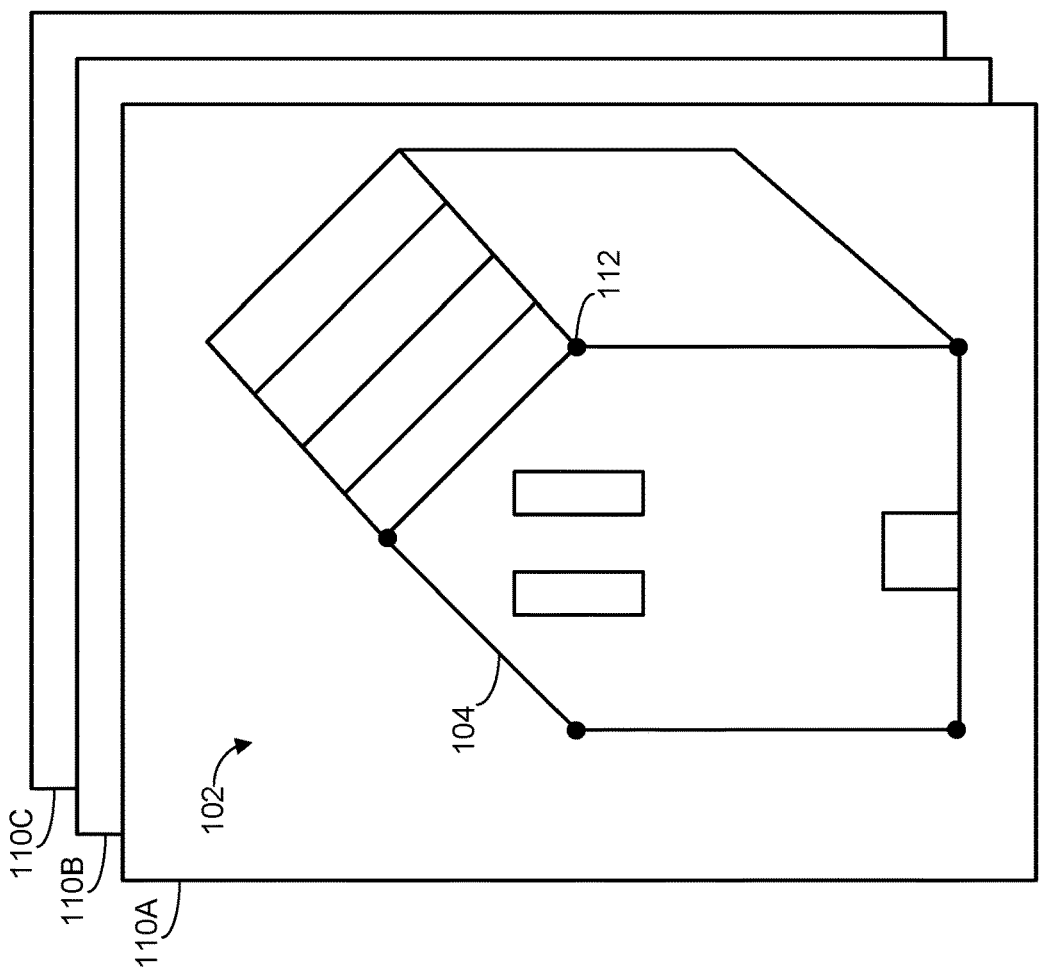
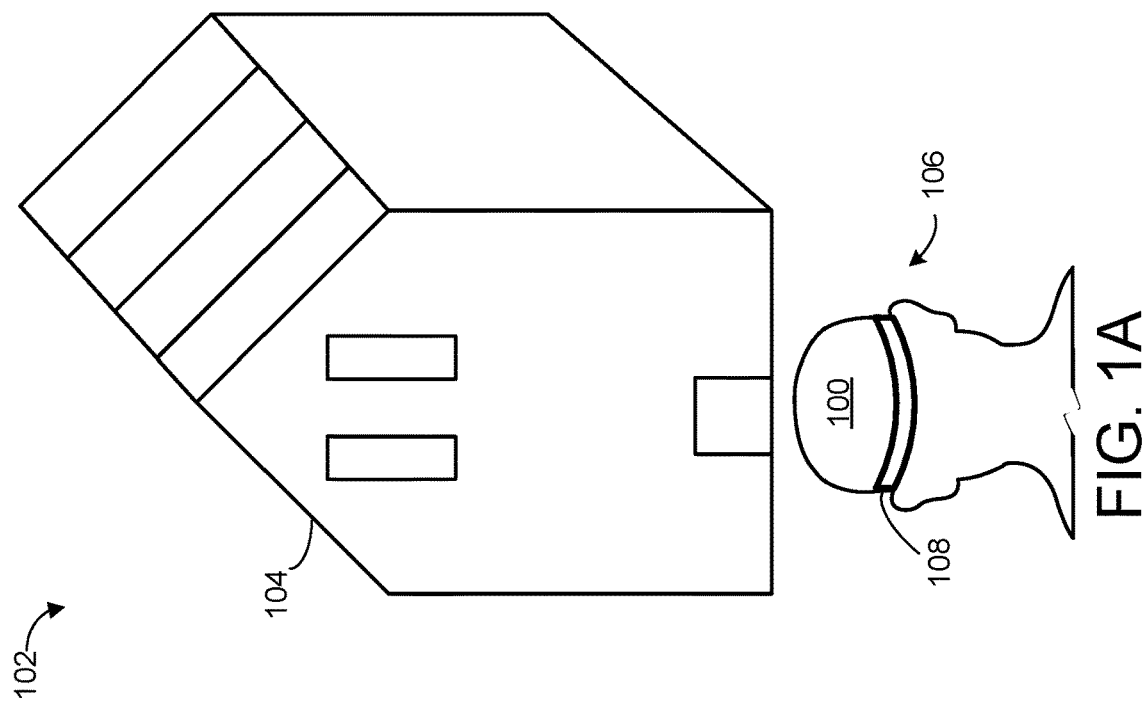

IMAGE-BASED LOCALIZATION

BACKGROUND

Image-based localization techniques may be utilized by mobile computing devices, robots, drones and other devices to estimate their position and orientation in a physical environment. For example, one or more images captured by a device may be compared to a precomputed map representing a 3D reconstruction of the space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for image-based localization includes, at a camera device, capturing a plurality of images of a real-world environment. A first set of image features are detected in a first image of the plurality of images. Before additional sets of image features are detected in other images of the plurality, the first set of image features is transmitted to a remote device configured to estimate a pose of the camera device based on image features detected in the plurality of images. As the additional sets of image features are detected in the other images of the plurality, the additional sets of image features are transmitted to the remote device. An estimated pose of the camera device is received from the remote device.

BRIEF DESCRIPTION OF THE DRAWINGS

FIGS. 1A and 1B schematically illustrate capturing a plurality of images of a real-world environment.

DETAILED DESCRIPTION

Figure 2:
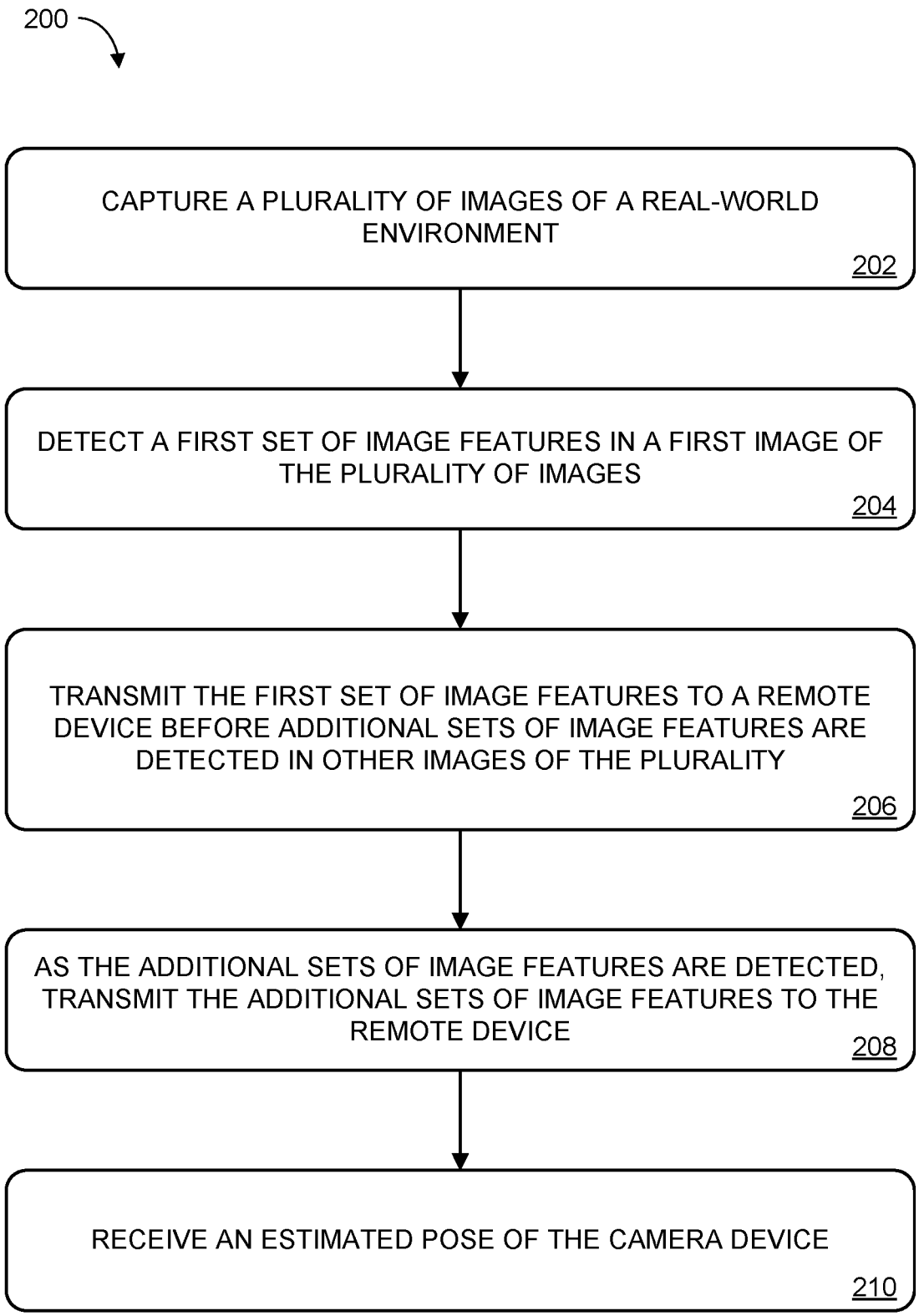
FIG. 2 illustrates an example method for image-based localization.

A wide variety of devices and related technologies may utilize image-based localization techniques. Examples may include wearable computing devices, such as head-mounted display (HMD) devices that provide augmented reality and/or virtual reality experiences, mobile devices (e.g., smartphones, tablets), robotic machines, and self-driving vehicles. These and other devices may use image-based localization techniques to determine their position and orientation (i.e., pose) in a real-world environment. Herein, such devices will be referred to as "camera devices." While camera devices will typically include, or be configured to interface with, at least one camera, camera devices may have any suitable hardware configuration.

Some approaches to image-based localization utilize knowledge of a prior digital three-dimensional (3D) map or scene model of a real-world environment. The digital environment map is essentially a spatial database including geometric data. In some examples, the geometric data includes points defined in three dimensions (e.g., x, y, z) distributed throughout 3D space to form a 3D point cloud reconstruction of the real-world environment. The 3D points may be associated with feature descriptors (e.g., multi-dimensional vectors) extracted from the source images or videos used to construct the map. Thus, the 3D points may be referred to as map features of a digital environment map.

Given a digital environment map of a real-world environment and using one or more images or videos captured by a camera device, an image-based localization task may estimate the 3D position (x, y, z) and 3D orientation (roll, pitch, yaw) of the camera device within the real-world environment. Camera localization algorithms may solve this task in two steps—first by matching 2D point features in the captured image(s) to 3D map features stored in the 3D map as 3D points. Next, the 6 degree-of-freedom (6DOF) pose of the camera may be computed using the 2D point to 3D point matches and their underlying coordinates.

In some cases, camera localization may be performed by a device other than the camera device used to capture the images, potentially conserving processing, battery, and/or storage resources of the camera device. For instance, images captured by a camera device may be transmitted to a remote device (e.g., server) that has access to the digital environment map of the real-world environment and performs the processing steps used to estimate the pose of the camera device. Furthermore, transmitting images to a remote device alleviates the need for the digital environment map to be shared with third parties.

The present disclosure primarily describes image-based localization in this context, in which images are transmitted from a camera device to a remote device that then estimates a pose of the camera device. However, the image-based localization techniques described herein may be implemented on a single device that captures images of a real-world environment, maintains a digital environment map, and performs image-based localization to estimate its own pose.

While it is sometimes possible to perform image-based localization on the basis of a single image, it is often desirable to use several different images, either captured at the same time (e.g., from different perspectives) and/or in succession (e.g., from the same perspective). This can provide additional data usable to output a more accurate pose estimate for the camera device. For instance, a single image of a real-world environment may in some cases not include enough detail (e.g., in the form of unique image features) to resolve the camera device to one particular pose with suitably high confidence. By using more images of the real-world environment for the image-based localization, it is relatively more likely that the images will collectively include enough detail for a pose of the camera device to be estimated with relatively high confidence. This problem may be especially notable in certain real-world environments. For instance, an image taken in front of a building façade including multiple visually similar rows of windows may be difficult to reconcile to any particular pose without additional detail.

However, performing image-based localization based on several images of the same real-world environment can present a different set of challenges. For instance, in a single-image scenario, a camera device may capture an image, extract image features from the image, and transmit the image (or image features) to a remote device, which may then estimate a pose of the camera device. By contrast, in a multi-image scenario, it may take relatively more time to capture several images, extract image features from each of the several images, and transmit each image (or set of image features) to the remote device, which may then take relatively longer to estimate a pose of the camera device, as more calculations may be required when more image features are provided.

Accordingly, the present disclosure is directed to techniques for image-based localization that use multiple images of a real-world environment to estimate the pose of a camera device. However, as will be discussed in more detail, the time required for the image-based localization process may be reduced using embodiments of the present disclosure by performing steps of the process in parallel, rather than performing all steps in a strict, nonoverlapping, series. In other words, and in one non-limiting example, a camera device may take multiple images of a real-world environment, begin extracting image features from a particular image before other images are captured, and transmit image features to the remote device as soon as they are detected, rather than after image features have been extracted for all images. Similarly, the remote device may begin attempting to estimate the pose of the camera device once it receives at least some image features, even as the camera device is still extracting additional image features from images of the real-world environment. Notably, this may be done regardless of whether the image features are extracted at the camera device, remote device, or other suitable device. Furthermore, the remote device may begin attempting to estimate the pose of the camera device as soon as even a single image feature is detected, without waiting for every image feature to be detected in a single particular image.

In this manner, image-based localization may realize the advantages of using multiple images (e.g., higher accuracy pose estimations), while at least partially mitigating the potential drawbacks (e.g., potentially higher latency before returning an estimated pose). For instance, the image-based localization techniques described herein can improve the operating efficiency of the camera device, as fewer local processing steps on the camera device are needed to accurately determine the pose of the camera device. This can conserve both electrical power and processing power of the camera device, allowing such power to instead be applied to other tasks. Furthermore, via the techniques described herein, the amount of time required to determine the pose of the camera device may also be reduced, as a pose estimate may be generated before all captured images of the real-world environment are processed. In some cases, a pose estimate may be generated before even a single image of the real-world environment has been processed.

FIG. 1A schematically depicts a user 100 in a real-world environment 102 that includes a structure 104. User 100 has a camera device 106 equipped with one or more cameras 108. In this example, the camera device takes the form of an HMD. However, as discussed above, camera devices may take any suitable form and include any suitable set of hardware resources.

FIG. 1B depicts a plurality of images 110A-110C of real-world environment 102. Such images may be used to estimate the pose of the camera device relative to the real-world environment. When the camera device is an augmented or virtual reality device, this may enable the camera device to display virtual images with desired real-world perceived positioning, for example, appearing to assume fixed positions within the real-world environment (i.e., world locked), or appearing to maintain a fixed position relative to the user (i.e., body locked). However, any suitable camera device may be used, and such a camera device may make use of an estimated camera pose for any suitable purpose.

Furthermore, image 110A is shown to include a plurality of image features, represented by black circles 112. As will be described in more detail below, such image features may be detected in the image in any suitable way. Furthermore, as used herein, the term "image feature" refers to computer data that describes or otherwise represents one or more portions of an image. In other words, while black circles are used to represent the positions at which image features are detected in image 110A, this is only for the sake of visual clarity. In practical implementations, "image features" may merely describe visual content in an image, without themselves being displayed or otherwise graphically represented at any point.

As discussed above, images 110A-110C of real-world environment 102 captured by camera device 106 may be transmitted to a remote device (e.g., server) for camera pose estimation. For instance, the remote device may have previously acquired a digital environment map of the real-world environment, the map including a plurality of map features. The map features may be characterized as a 3D point cloud representing a reconstruction of the real-world environment. By determining correspondences between map features in the digital environment map and image features detected in the image, the pose of the camera device at the time images 110A-110C were captured may be deduced.

However, as discussed above, while using multiple images to estimate the pose of a camera device may increase the accuracy of the resulting pose estimate, using multiple images can also increase the overall length of time required to complete the process. Accordingly, FIG. 2 illustrates an example method 200 for image-based localization that, when used, may at least partially reduce the time required to estimate a pose of a camera device from multiple images. Method 200 involves communication between a camera device and remote device. Notably, however, both of the camera device and remote device may have any suitable hardware configurations and form factors. Furthermore, in many cases, operations performed at the camera device and remote device may occur at substantially the same time. As will be discussed in more detail below, capturing of images, detection of image features, and estimation of camera pose may overlap at least partially, such that a pose is estimated for the camera device before all images of the real world have been captured, or all image features in the captured images have been detected.

Furthermore, the term "remote device" refers to any suitable computing device configured to interface with a camera device and perform image-based localization to estimate a pose of the camera device. There may be any suitable physical separation between the camera device and remote device. Communication between the camera device and remote device may be achieved in any suitable way. As examples, the camera device and remote device may be communicatively coupled using a wired connection or may employ a wireless connection via Wi-Fi, Bluetooth, or any other suitable wireless communication protocol. When communication occurs over a network, the network may take the form of a local area network (LAN), wide area network (WAN), wired network, wireless network, personal area network, cellular network, or a combination thereof, and may include the Internet. Furthermore, as discussed above, in some cases image-based localization may be performed on a single device (e.g., camera device) without involving additional devices.

Figure 3:
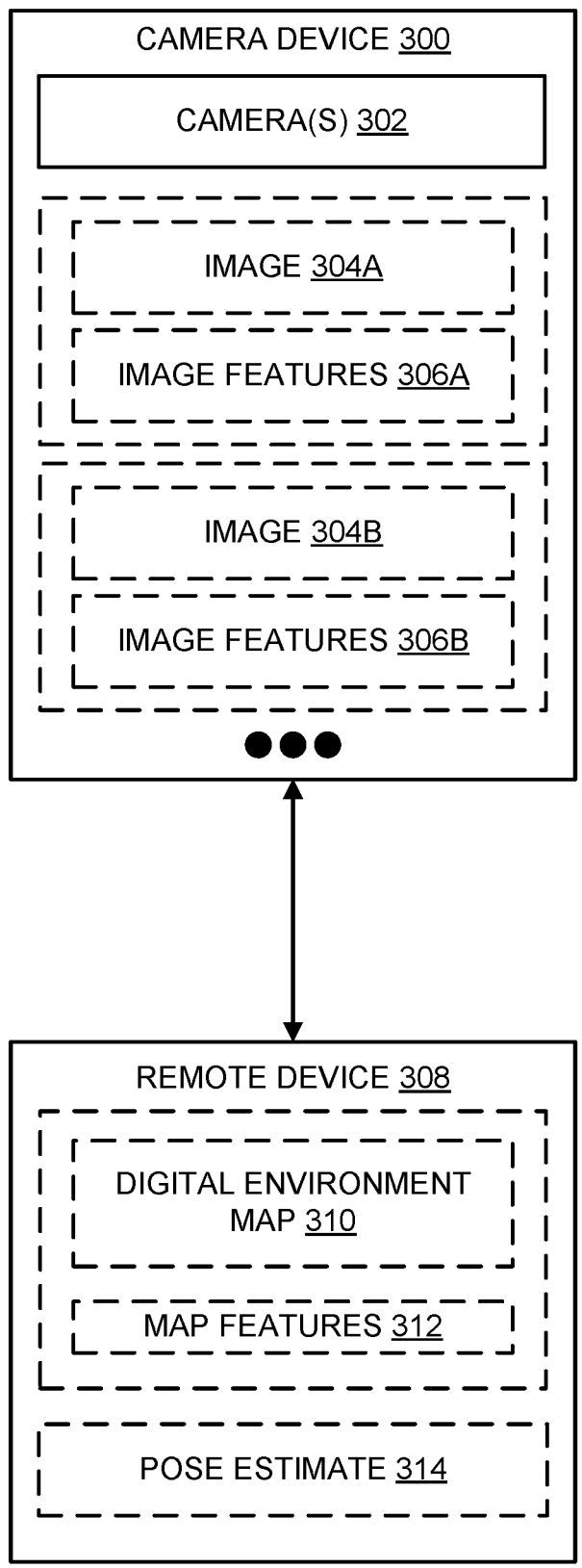
FIG. 3 schematically illustrates data exchange between a camera device and remote device.

At 202, method 200 includes capturing a plurality of images of a real-world environment. This is illustrated with respect to FIG. 1, in which camera device 106 captures a plurality of images 110A-110C of real-world environment 102. Furthermore, FIG. 3 schematically shows an example camera device 300 configured to use one or more cameras 302 to capture a plurality of images 304A and 304B.

In some examples, the camera(s) 302 may comprise one or more RGB cameras, IR cameras, and/or depth cameras (such as time-of-flight, structured light, or other form of depth cameras). A camera device may include any suitable number of cameras, including a single camera, pair of cameras (e.g., a stereoscopic camera pair), camera array including a plurality of cameras, etc. Furthermore, a camera device may include multiple individual types of cameras—e.g., an RGB camera and a depth camera.

In some cases, the plurality of images captured by the camera device may be captured substantially at once. For instance, in a device with four on-board cameras, all four cameras may be activated substantially simultaneously, resulting in four different images with different perspectives captured at the same time. Such images may optionally be combined into a single composite image using suitable image editing techniques. Given that various hardware components of the camera device may operate at slightly different speeds or have slightly different associated latency requirements, the plurality of images need not be captured exactly simultaneously, but rather may be captured close enough together that the pose of the camera device is unlikely to have changed meaningfully between capture of the various images. For instance, in the span of one thousandth of a second, it is unlikely that the pose of the camera device will have changed substantially enough to interfere with downstream pose estimation steps. In some implementations, even images captured tenths of a second apart may be described as captured "substantially at once," depending on precision requirements for the final estimated pose.

When the camera device includes multiple cameras, the multiple cameras may have any suitable spatial relationship with respect to each other and with respect to other hardware components of the camera device. Typically, the spatial arrangement of the multiple cameras will be known to the camera device in some way. For instance, the camera device may include manufacturer calibration data that indicates the relative 3D positions of each of multiple cameras of the camera device. Additionally, or alternatively, the spatial arrangement of the multiple cameras may be specified in another suitable way—e.g., by a user during a manual calibration process. Some information regarding the spatial arrangement of the multiple cameras may in some cases be transmitted to the remote device, as will be discussed in more detail below.

Additionally, or alternatively, the multiple images captured by the camera device of the real-world environment may be captured sequentially by the same camera and/or multiple different cameras. The interval of time between capture of sequential images may in some cases be relatively small—e.g., on the order of fractions of a second—although any suitable interval may be used. Furthermore, the interval between sequential image captures need not be regular. In some cases, images may be captured both sequentially and simultaneously—for instance, a device equipped with multiple cameras may trigger two or more cameras at once multiple times sequentially.

Returning briefly to FIG. 2, at 204, method 200 includes detecting a first set of image features in a first image of the plurality of images. This is shown in FIG. 3, as camera device 300 is shown to include an image 304A and an associated set of image features 306A. Furthermore, in FIG. 1B, the positions at which image features have been detected are indicated by black circles 112. It will be understood that each black circle shown in FIG. 1B may have an associated image feature, and that each individual image captured by a camera device hay have any number of such features (e.g., tens, hundreds, thousands, or more).

As shown in FIG. 1B, the two-dimensional distribution of the image features may reflect geometric attributes and the visual appearance of objects that are present in the physical environment at the time the image was taken. In the present example, the image features include features that correspond to the shape, dimensions and other features of the structure 104.

Image features may take a variety of suitable forms and may be detected in a variety of suitable ways. As one example, the image features may be scale invariant feature transform (SIFT) features. A SIFT feature includes a SIFT keypoint, which stores geometric information relevant to the feature, including the 2D position, scale, and one-dimensional angular orientation of the feature. A SIFT feature also includes a feature descriptor, which is implemented as a 128-dimensional vector. A multi-step process may be used to detect SIFT features in an image. It will be understood, however, that any suitable approach for extracting image features may be used, and such image features need not be SIFT features. As another example, detected image features may be speeded-up robust features (SURF). Typically, an image feature will include some description of the underlying image data with which the image feature is associated (e.g., expressed as a feature vector), and an indication of a two-dimensional (2D) pixel position at which the image feature was identified in a corresponding image of the real-world environment.

Returning briefly to FIG. 2, at 206, method 200 includes, before additional sets of image features are detected in other images of the plurality of images captured by the camera device, transmitting the first set of image features to a remote device. Notably, the set of image features detected in the first image need not all be transmitted to the remote device at once. Rather, in some examples, transmission of image features may begin as soon as even a single image feature is detected in the first image. Furthermore, the image features detected in the first image may be transmitted in any suitable order. This can include the order in which the image features were detected, an order that groups spatially-adjacent image features together, an order that prioritizes image features that are predicted to be more useful or distinguishing for the purpose of pose estimation (e.g., due to each image feature's "uniqueness"), etc. Next, at 208, method 200 includes, as the additional sets of image features are detected in the other images of the plurality, transmitting the additional sets of images to the remote device. These additional sets of image features may similarly be transmitted at any time and in any order.

The remote device may be configured to estimate a pose of the camera device based on image features detected in the plurality of images. Furthermore, the remote device may be configured to begin attempting to estimate the pose of the camera device as soon as any image features are received, even if such image features are insufficient to estimate a pose for the camera device having sufficiently high confidence. Thus, as the remote device continues to receive image features from the camera device, it may progressively estimate additional poses for the camera device, until eventually one or more poses are estimated that have sufficiently high confidence for reporting to the camera device. Notably, in some cases, the remote device may estimate a sufficiently high confidence pose for the camera device before receiving image features for all of the images captured by the camera device. This may therefore save time as compared to other multi-image localization techniques, in which a pose is not estimated until images features from every captured image are extracted and analyzed.

This is illustrated in FIG. 3, in which camera device 300 includes two different images 304A/304B, each having sets of associated image features 306A/306B. Such information may be transmitted to remote device 308 for camera pose estimation. However, as discussed above, the camera device may begin transmitting image features to the remote device as soon as the first set of image features 306A is detected, or even as soon as a single image feature is detected in image 304A, instead of waiting until image features are detected in every captured image. In other words, the remote device may begin attempting to estimate a pose of camera device 300 based on one or more image features 306A before all of the image features 306B are detected, or even before image 304B is captured.

Figure 4:
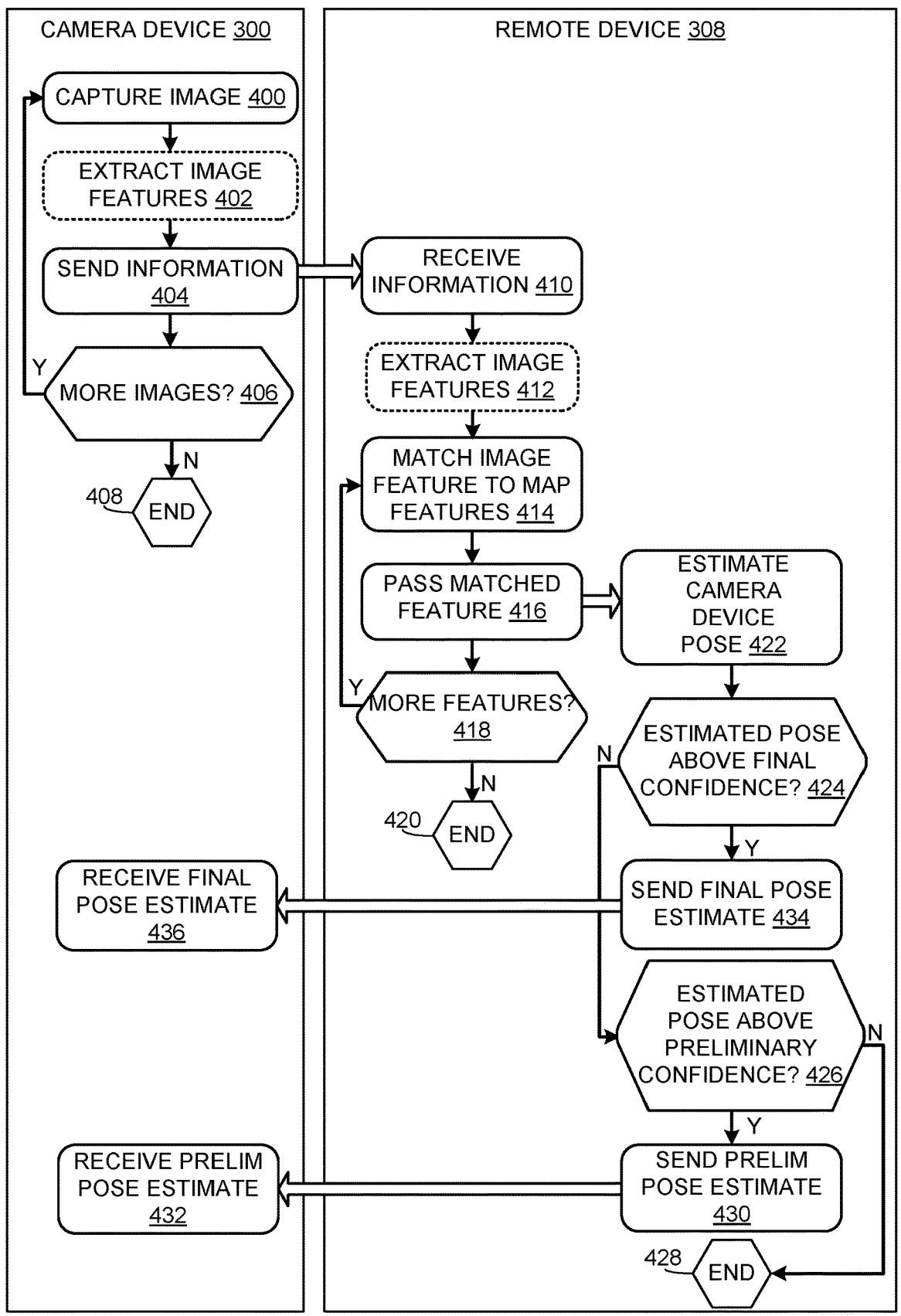
FIG. 4 illustrates an example flowchart for image-based localization.

FIG. 4 illustrates an example flowchart for image-based localization. At 400, camera device 300 captures one or more images of a real-world environment, such as environment 102 shown in FIG. 1. As discussed above, camera device 300 may in some cases capture multiple images substantially at the same time, and/or capture one or more images sequentially. At 402, camera device 300 optionally may extract image features from an image captured at 400. Notably, image features need not always be detected at the camera device. In other words, image features may be detected at the camera device, remote device, or any other suitable device.

Continuing with FIG. 4, at 404 camera device 300 transmits information to remote device 308. The specific information sent by the camera device may vary depending on whether image features are detected at the camera device or the remote device. In cases where image features are detected at the camera device, then the information transmitted by the camera device may include the image features, and may or may not also include the actual images that the features were detected in. However, in cases where images features are detected at the remote device, then the camera device may transmit the images of the real-world environment without first detecting any image features.

Figure 5:
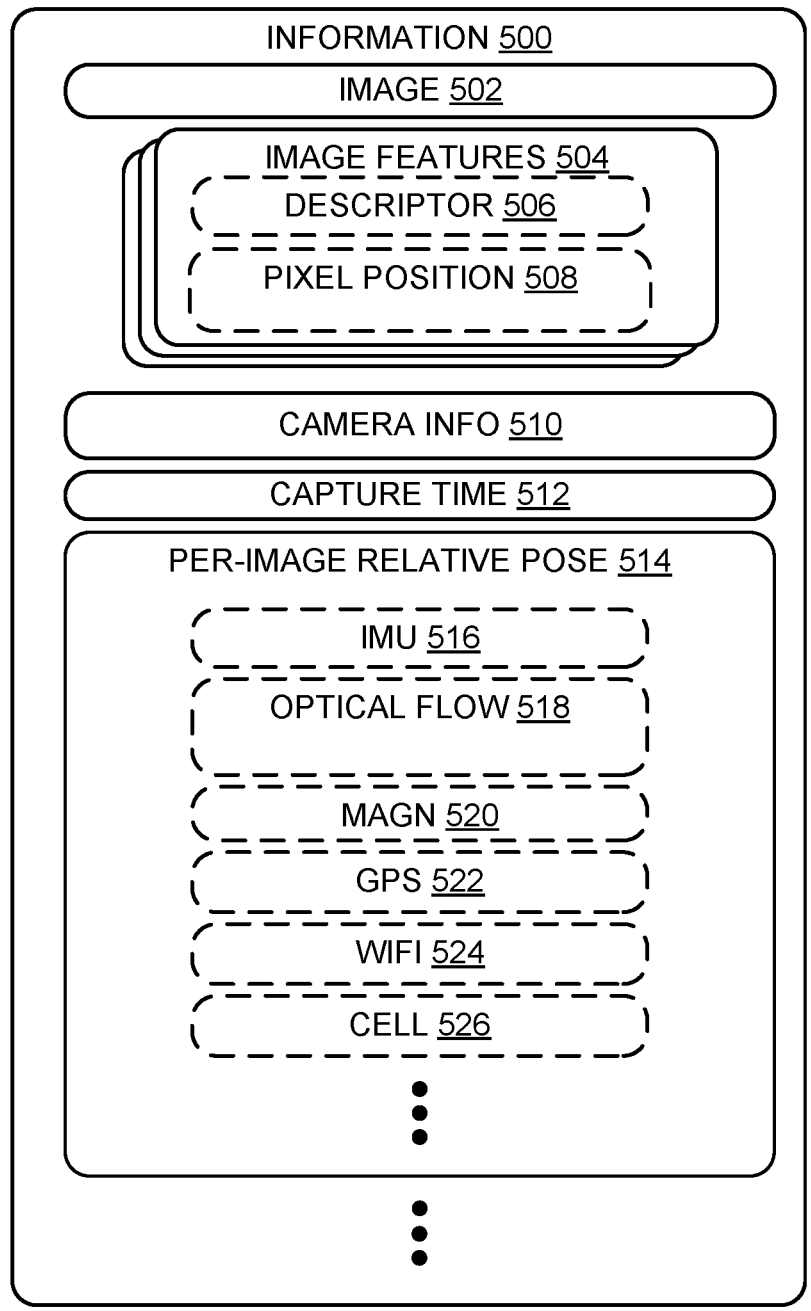
FIG. 5 schematically depicts examples of data exchanged between a camera device and remote device during image-based localization.

FIG. 5 schematically shows specific examples of information 500 that may be transmitted from the camera device to the remote device. Such information may be packaged or formatted in any suitable way. Information 500 may be divided between any suitable number of discrete data packets or transmissions. Furthermore, it will be understood that the specific data included in FIG. 5 is presented as a non-limiting example. In various implementations, a camera device may transmit more information, less information, and/or different information to a remote device.

In the example of FIG. 5, information 500 includes an image 502 of a real-world environment captured by a camera device. However, depending on the implementation, the camera device may or may not transmit full captured images to the remote device. For instance, in cases where image features are detected at the camera device, then the data transmitted from the camera device to the remote device may optionally omit full images of the real-world environment in favor of the image features detected in such images. In cases where image features are detected at the remote device, then the camera device will typically transmit its captured images of the real-world environment to the remote device so that image features may be detected by the remote device.

Information 500 also includes a set of image features 504 corresponding to image 502. Thus, in the example of FIG. 5, image features are detected by the camera device. Each image feature includes a descriptor 506, as well as a 2D pixel position 508 at which the image feature was detected in image 502. Each descriptor 506 will include some representation of the visual content of image 502 at which a corresponding image feature was detected—for instance, taking the form of a multi-dimensional feature vector.

Information 500 also includes camera info 510, which may refer to any suitable metric or specification that applies to a camera of the camera device used to capture image 502. As examples, camera info 510 may specify the type of camera (e.g., RGB, IR, make/model), zoom parameters of the camera, a spatial relationship of the camera relative to other cameras of the camera device, etc. For instance, as discussed above, in some cases the camera device may be configured to use multiple cameras to capture multiple images of the real-world environment substantially at once. In such cases, the information transmitted to the remote device may include some information indicating a spatial relationship of each of the different respective cameras of the camera device relative to one another. This may take any suitable form. For instance, camera info 510 may specify a physical distance and orientation of a camera used to capture image 502 relative to other cameras of the camera device, and/or other suitable device components or frames of reference. As another example, camera info 510 may include a reference name or label for the camera used to capture image 502, such as "interior camera" or "left-side camera," which may be useful in cases where the remote device has information regarding the geometry and configuration of the camera device.

As shown, information 500 includes a capture time 512 for image 502. The capture time may be expressed in any suitable way. For instance, the capture time may be defined relative to a system clock of the camera device, a reference time shared between the camera device and remote device, a time elapsed since the beginning of a particular process (e.g., the first transmission may occur at time 0), etc.

Information 500 also includes a per-image relative pose 514 for the camera device at the time image 502 was captured. Typically, in cases where the camera device captures images of the real-world environment sequentially, the pose of the camera device may change between capture of sequential images. Thus, to facilitate more efficient pose estimation by the remote device, the camera device may track its own pose relative to some internal frame of reference and transmit such information to the remote device. As used herein, the term "relative pose" refers to a pose tracked by the camera device typically without fully resolving absolute position relative to the surrounding real-world environment. For instance, after capturing a first image of a real-world environment, the camera device may track its own movements between capture of sequential images of the real-world environment and transmit such information to the remote device. The "relative pose" therefore differs from the "estimated pose" or "absolute pose" output by the remote device, which defines the position and orientation of the camera device relative to a different frame of reference (e.g., a world-locked coordinate system corresponding to the real-world environment, or another suitable frame of reference).

The relative pose of the camera device may be determined and specified in any suitable way. FIG. 5 includes various examples of different types of information that may be used by the camera device to track its movements as it captures images of the real-world environment. Specifically, information 500 includes data 516 from an inertial measurement unit (IMU) of the camera device, as well as data 520 from a magnetometer and data 522 from a global positioning system (GPS) receiver. Movements of the camera device may additionally or alternatively be tracked based on the optical flow 518 observed by one or more cameras as the camera device moves. For instance, if the camera device moves while the surrounding real-world environment remains stationary, then any changes in size, position, or orientation of real-world objects visible to a camera of the camera device can be attributed to movements of the camera device and used to estimate such movements. As additional examples, movements of the camera device may be estimated based on data 524 and/or 526 indicating changes in any Wi-Fi/cellular/other signals in the real-world environment, which can correspond to movements of the camera device.

Notably, the relative pose of the camera device need not be computed by the camera device itself. Rather, information used to calculate the relative pose (e.g., IMU data 516, optical flow data 518, magnetometer data 520, GPS data 522, Wi-Fi data 524, and/or cellular data 526) may be transmitted to another suitable device, which may use such information to calculate the relative pose of the camera device. Thus, in some examples, the relative pose of the camera device may be calculated by the remote device based on information received from the camera device, even as the remote device is working to output an absolute pose for the camera device. Notably, the relative pose of the camera device may be calculated in any suitable way and based on any suitable information, regardless of which device(s) perform the calculation. For instance, the relative pose of the camera device may be calculated by the remote device based on the captured image features and/or any image features detected in the images, in addition to or instead of any other relevant information.

Returning to FIG. 4, after the camera device sends information to the remote device at 404, the camera device determines at 406 whether more images of the real-world environment are to be captured. If yes, the camera device captures another image at 400. If no, then the camera device discontinues capturing images at 408. Capture of images may be discontinued after a predetermined number of images has been captured, a predetermined amount of time has elapsed, a user command, the camera device entering a low-power or off mode, the camera device receiving an instruction from another device (e.g., the remote device), the camera device receiving an estimated pose that exceeds a confidence threshold, and/or for any other suitable reason. Furthermore, after image capture discontinues at 408, new images may be subsequently captured at 400 in response to any suitable trigger (e.g., device pose estimation falling below a threshold confidence).

Turning briefly to FIG. 2, at 210, method 200 includes receiving an estimated pose of the camera device. As discussed above, the estimated pose specifies the position and/or orientation of the camera device when the images of the real-world environment were captured.

The pose of the camera device may be estimated by the remote device in any suitable way. One specific process for pose estimation will now be described with respect to FIG. 4. After the camera device sends information at 404, which may include any or all of the information discussed above with respect to FIG. 5, the remote device receives the information at 410. At 412, the remote device may detect image features in images of the real-world environment transmitted by the camera device, in cases where detection of image features occurs on the remote device. Notably, detection of image features at the remote device may be performed even as the remote device is continuing to receive information (e.g., additional images) from the camera device.

At 414, the remote device matches image features detected in the plurality of images of the real-world environment to one or more map features in a digital environment map representing the real-world environment. In FIG. 3, remote device 308 is shown including a digital environment map 310 and a set of corresponding map features 312. By identifying correspondences between detected image features and map features of the digital environment map, the remote device may estimate a pose of the camera device, shown in FIG. 3 as pose estimate 314.

In some examples, the map features of the digital environment map may take the form of a 3D point cloud representing a reconstruction of the real-world environment. The digital environment map may include any suitable number of points—in some examples, a 3D point cloud may include 20,000, 30,000 or more 3D points that denote various locations on surfaces within the real-world environment.

Such a digital environment map may be generated in any suitable way. In general, a real-world environment will be mapped using a suitable imaging device that captures a plurality of images or videos of the real-world environment from different positions. These images may be grayscale images, color images, depth images, etc. Image features may be detected in each image, as discussed above. By detecting image features that are common to more than one of the captured images, the spatial relationship between the images may be determined. The distance between each image feature and the imaging system may be inferred from the observed parallax shift when the same image feature is detected in multiple images captured from different positions. Additionally, or alternatively, depth information from a depth camera may be used to identify the dimensions of the real-world environment and the distances between the imaging system and each image feature. In some implementations, the pose of the imaging system may be tracked as it captures the plurality of images, providing additional information that can be used to stitch the plurality of images into a 3D representation of the real-world environment.

As noted above, each of the map features are associated with feature descriptors extracted from the source images that are used to construct the 3D map. A feature descriptor may comprise a multi-dimensional vector that encodes the appearance of a surface around a 3D map feature. For example, an image patch (such as 32×32 pixels) around a given pixel at which a map feature is detected may encode the appearance of a surface around that point into a feature descriptor that is more compact.

Feature descriptors need not be generated at every 3D map feature of a 3D point cloud. In some examples, feature descriptors may be selectively generated at distinguishing features of the map, such as corners, highly textured areas, etc. Additionally, in some examples an initially generated point cloud may be decimated to reduce the density of map features included in the cloud. For example, a subset of representative map features may be selected in the point cloud, and non-selected features within a predetermined distance of the selected 3D map features may be discarded. In this manner, the resulting decimated 3D point cloud may be more quickly loaded and more easily processed by the remote device.

Additionally, or alternatively, the 3D map may include other suitable information describing the real-world environment. As examples, such information can include lines, planes, and/or other higher-level objects; Wi-Fi/Bluetooth identifiers and/or signal strengths; GPS coordinates; a gravity vector; a cardinal direction vector (e.g., magnetic north); and/or any other suitable information that can be used to resolve the position of a camera device relative to the real-world environment.

Estimating the pose of a camera device may involve determining correspondences between image features detected at 2D pixel positions of images of a real-world environment and map features having 3D map positions in a digital environment map. This may be done by searching the 3D map for the feature descriptors associated with each image feature and identifying the 3D map features having the most similar feature descriptors in the 3D point cloud. In other words, determining the correspondences may include identifying a set of image features having feature descriptors that match feature descriptors of 3D map features in the 3D map. As a result, 2D points detected in images of the real-world environment correspond to 3D points associated with 3D map features, giving a set of 2D point to 3D point correspondences. This feature descriptor matching step can be implemented using one of many nearest neighbor matching techniques. The L2-distance between the descriptor vectors may be used to calculate the pairwise feature similarity.

Notably, not all of the determined correspondences are necessarily correct. In practice, some number of incorrect correspondences may be determined. This is because the underlying feature descriptors can be ambiguous and do not always allow sufficient discrimination between a feature descriptor of an image feature and multiple feature descriptors associated with 3D points in the map.

Furthermore, each image of the real-world environment may include items, objects, people, etc., that were not present when the real-world environment was mapped. Thus, one or more image features may be detected in various images captured by the camera device that are not represented in the digital environment map. Typically, such image features will not correspond to any 3D map features. This may be advantageous in some scenarios, as any private details depicted in the plurality of images will likely not correspond to any 3D map features in the digital environment map, thus limiting the amount of information that the remote device can infer about the private details. There may also be some number of map features in the map that do not match any of the image features in the plurality of images.

Returning again to FIG. 4, once correspondences are identified between image features and map features at 414, such correspondences are passed along at 416 to another process or application configured to estimate a pose for the camera device. Notably, as with other steps of the image-based localization process described herein, image features may be matched to map features and passed along for pose estimation at any suitable time. In other words, identified correspondences may be passed along for pose estimation before all the image features in a particular image are matched or even extracted, before all the images of the real-world environment have been transmitted or captured, etc.

As such, at 418, the remote device determines whether there are additional image features to be matched with map features in the digital environment map. If yes, the remote device matches such image features at 414. If no, the remote device discontinues matching of image features at 420. Notably, discontinuing matching of image features at 420 does not represent an end to the overall image-based localization process, as any matched image features may be used to estimate a pose of the camera device. Furthermore, should additional images and/or image features be received from the camera device, the remote device may resume matching image features at 414.

Once correspondences are identified between image features and map features, such correspondences may be used at 422 to estimate a pose of the camera device. Pose estimation may be done in any suitable way. In some examples, estimating the pose of the camera device may be an iterative randomized process, in which correspondences between 2D pixel positions of image features and 3D map positions of map features are identified for a plurality of candidate camera device poses, and these candidate camera device poses are evaluated for their consistency with the underlying correspondence data. In one example procedure, the pose of the camera may be estimated from the determined correspondences using a random sample consensus (RANSAC) method. In such cases, a minimal or non-minimal solver may be used to calculate a plurality of candidate camera device poses from subsets of the determined correspondences. However, it will be understood that other suitable approaches may be used to estimate the camera pose that do not use a RANSAC framework.

To begin, the remote device may identify a subset of correspondences from the overall set of determined 2D image feature to 3D map feature correspondences. In some cases, the number of correspondences in the identified subset may correspond to a minimal number of data points necessary to calculate a finite number of solutions using a method known as a minimal solver. For instance, when fitting a 2D line to a set of 2D points, a minimum of two unique data points are needed to find a unique 2D line (single solution) that exactly passes through the 2D points. A single data point, on the other hand, could be consistent with an infinite number of potential solutions. Thus, for this line fitting example, two data points are the minimum number required for a minimal solver. A non-minimal solver, by contrast, may use more than two data points.

Continuing with the 2D line fitting example, a plurality of subsets of 2D data point pairs may be selected. In a RANSAC framework, these subsets are selected at random. If the minimal solver is applied to each subset (i.e., pair of 2D points), different potential solutions may be found from each subset. However, some potential solutions (2D lines) will be more consistent with the input data than other potential solutions. In other words, some potential lines will pass through more 2D points in the dataset than others. In RANSAC, for each potential solution identified by a minimal solver, the solution (i.e., 2D line) is compared to other 2D data points in the dataset to determine which points are consistent with the proposed solution (i.e., "inliers") vs. which points are not consistent with the proposed solution (i.e., "outliers"). Any solution that has the highest inlier to outlier ratio, or has at least a threshold number of total inliers, may be accepted as the actual solution—e.g., 2D the line that best fits the set of 2D points.

Returning to the camera pose estimation problem, depending on the information available, a RANSAC solver may output a finite number of solutions or potential pose candidates from a subset of identified correspondences. In other words, for each identified subset of correspondences, the remote device may calculate a set of candidate camera device poses that satisfy the subset of correspondences.

The number of correspondences required for a minimal solver may in some cases be reduced when some information about the camera's pose is already known. For instance, when capturing the plurality of images of the real-world environment, the camera device may detect a gravity vector relative to its current pose (e.g., via onboard 3-axis accelerometer). This gravity vector may in some cases be included in the information transmitted by the camera device to the remote device. Thus, two degrees of freedom of the camera's 3D orientation (corresponding to roll and pitch) may already be known, reducing the complexity of estimating the remaining degrees of freedom.

Furthermore, in cases where the plurality of images of the real-world environment are captured sequentially and the camera device transmits relative pose information as discussed above with respect to FIG. 5, such relative pose information may be used when estimating poses for the camera device. In other words, rather than estimating poses independently for each image captured by the camera device, the remote device may use the relative pose information to further narrow down the potential set of estimated poses for the camera device. For instance, a high confidence pose for the camera device will be consistent with each image transmitted to the remote device, as well as the movements of the camera device between image captures.

Once candidate camera device poses are calculated for each subset of correspondences, the remote device may identify a best overall camera device pose from the set of every candidate camera device pose. In other words, several camera device pose hypotheses are identified by the remote device, at least one of which is likely to correspond to the actual pose of the camera device. In general, the best overall camera device pose will be more consistent than other candidate camera device poses with the overall set of correspondences. In other words, the remote device may determine, for each candidate camera device pose, how many of the determined correspondences would be inliers and how many would be outliers, and the best overall camera device pose may be identified on this basis.

Depending on the implementation and the specific pose estimation techniques used, each estimated camera device pose may include a corresponding confidence value. In the case of RANSAC, this confidence value may be proportional to the inlier/outlier ratio described above, in which pose estimates that have more inliers (e.g., have more correspondences consistent with the pose than inconsistent with the pose) have relatively higher confidence values. Furthermore, the remote device need not estimate a single pose of the camera device and then stop. Rather, as the remote device receives additional images and/or image features from the camera device, the remote device may progressively output a plurality of estimated poses of the camera device based on identified correspondences between image features and map features. Each estimated pose may have a corresponding confidence value proportional to a quantity of the correspondences identified when each respective estimated pose was output, as receiving additional image features will generally provide the remote device with more data usable to produce more accurate pose estimates.

Thus, at various times, the remote device may generate any number of different pose estimates for the camera device, any or all of which may be transmitted to the camera device. In other words, an estimated pose received by the camera device may in some cases be a preliminary estimated pose that is received before later receiving a higher-confidence final pose estimate. The preliminary estimated pose may be generated by the remote device and received by the camera device at any suitable time, including before the camera device has finished capturing images of the real-world environment, before sets of image features are detected for every image of the real-world environment captured by the camera device, before all detected image features are matched to corresponding map features, etc.

In some examples, the remote device may output a pose estimate for the camera device before even a single image of the real-world environment has been fully analyzed to detect image features. In other words, upon capturing a single image of the real-world environment, image features may be extracted from the image at either the camera device or remote device. The remote device may then begin attempting to determine the absolute pose of the camera device before every image feature in the image has been detected, or otherwise received by the remote device. In this manner, the techniques for image-based localization discussed herein can result in faster pose estimation than traditional single-image pose estimation techniques, which typically would not begin generating pose estimates until the single captured image has been fully analyzed to detect image features.

As discussed above, the preliminary estimated pose may have an associated confidence value proportional to a quantity of image features transmitted to the remote device before the preliminary estimated pose was estimated. Whether the preliminary estimated pose is transmitted to the camera device may, however, depend on whether the confidence value associated with the preliminary estimated pose exceeds one or more confidence thresholds.

Returning to FIG. 4, after the remote device estimates a camera device pose at 422, the remote device determines at 424 whether the estimated pose exceeds a final confidence threshold. This threshold may be relatively high, such that any estimated pose having a higher confidence value than the final confidence threshold is designated as a final estimated pose, at which point image-based localization may be discontinued.

If the confidence value of the estimated pose does not exceed the final confidence threshold, the remote device may determine whether the confidence value exceeds one or more lower confidence thresholds. For example, at 426, the remote device determines whether the estimated pose exceeds a preliminary confidence threshold. If no, then at 428 the estimated pose is not sent to the camera device at this time, and the remote device may optionally continue generating pose estimates until a pose that exceeds the preliminary confidence threshold is estimated or the process is stopped for another reason. If yes, then the estimated pose may be designated as a preliminary estimated pose, sent to the camera device at 430, and received by the camera device at 432.

Notably, even after sending a preliminary pose estimate to the camera device, the remote device may continue receiving images and/or image features from the camera device and continue generating new pose estimates. Thus, even after receiving the preliminary pose estimate, the camera device may receive one or more additional estimated poses having been estimated based on more detected image features than the preliminary estimated pose. As such, the one or more additional estimated poses may have correspondingly higher confidence values. Eventually the remote device may estimate a pose for the camera device having a confidence value that exceeds the final confidence threshold at 424. This final estimated pose may then be sent to the camera device at 434 and received at the camera device at 436.

Notably, between capture of an image of a real-world environment and receipt of a corresponding pose estimate, the actual pose of the camera device may change. In other words, by the time the camera device receives an estimated pose from the remote device, the estimated pose may no longer be accurate due to movements of the camera device. Thus, in some scenarios, the remote device may report an estimated camera pose along with a timestamp, or other indicator of time passage, relative to a time-of-capture of one or more images of the real-world environment that the estimated pose is based on. The camera device may then update the estimated pose based on its own internal movement tracking data including, for example, any of the relative pose data described above with respect to FIG. 5. For instance, if the remote device indicates that the estimated pose is specific to a point in time 0.25 second in the past, and the camera device determines that it has moved 3 mm forward in that time, then the estimated pose may be adjusted 3 mm forward.

Additionally, or alternatively, the remote device may anticipate movements of the camera device as it estimates poses. For instance, based on information received from the camera device (e.g., relative pose information), and/or information inferred during pose estimation, the remote device may determine that the camera device is moving in a particular direction at a particular rate. By using a measured or estimated network latency between the remote device and camera device, the remote device may determine that, for example, it will take 0.25 seconds for an estimated pose to reach the camera device. Thus, the remote device may modify its estimated pose to account for movements of the camera device during the 0.25 second latency window. For example, if the remote device determines that the camera device is panning to the right at a certain rate, the remote device may estimate a pose for the camera device that includes extrapolated rightward-motion proportional to the observed network latency. Similar extrapolation may be used to update an estimated pose to account for movements of the camera device since a time-of-capture of an image of the real-world environment that the estimated pose is based on.

Once the final estimated pose is received, the camera device may in some cases terminate the image-based localization process. For instance, the camera device may discontinue capturing new images of the real-world environment, detecting or transmitting sets of image features to the remote device, and receiving pose estimates from the remote device. Similarly, the remote device may stop receiving images and/or image features from the camera device and may stop generating new pose estimates. At this point, tracking of the pose of the camera device may be done by the camera itself—e.g., via suitable position/orientation sensors of the camera device.

In other cases, however, image-based localization need not stop after any particular estimated pose is sent to the camera device. Rather, image-based localization may continue potentially indefinitely—e.g., as long as the camera device is in use it may continue capturing new images of the real-world environment and receiving new pose estimates from the remote device. This may facilitate potentially high accuracy pose tracking for camera devices that lack other on-board motion sensors, such as an IMU. Alternatively, image-based localization may be selectively discontinued and recontinued—for instance, the remote device may be used to reestablish a more certain camera pose any time the camera device becomes uncertain of its absolute pose.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
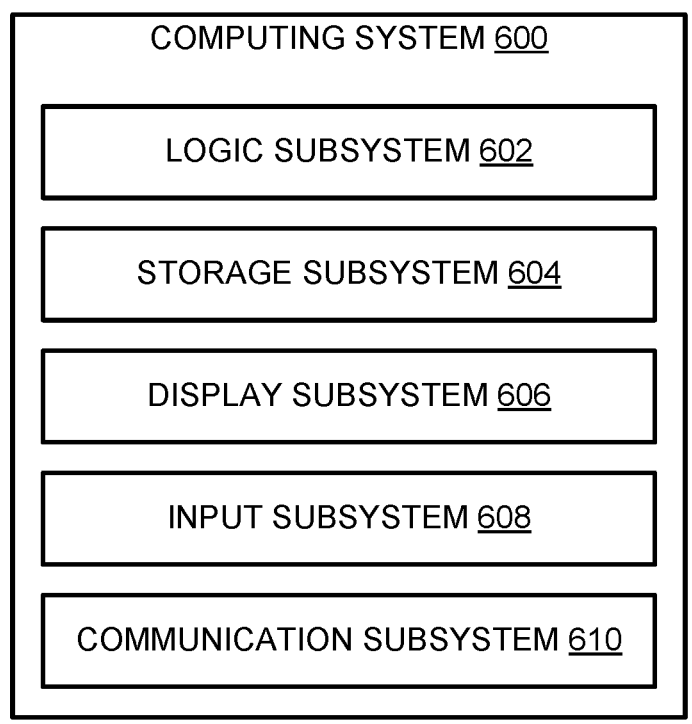
FIG. 6 schematically shows an example computing system.

FIG. 6 schematically shows a simplified representation of a computing system 600 configured to provide any to all of the compute functionality described herein. Computing system 600 may take the form of one or more camera devices, virtual/augmented/mixed reality computing devices, mobile communication devices (e.g., smart phone), tablet computers, home-entertainment computers, gaming devices, mobile computing devices, wearable computing devices, Internet of Things (IoT) devices, embedded computing devices, personal computers, network-accessible server computers, and/or other computing devices. Non-limiting examples of computing system 600 may include camera devices 106 and 300, as well as remote device 308.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data including, for example, images captured by a camera device, as well as poses estimated for the camera device. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

In an example, a method for image-based localization comprises: at a camera device, capturing a plurality of images of a real-world environment; detecting a first set of image features in a first image of the plurality of images; before additional sets of image features are detected in other images of the plurality, transmitting the first set of image features to a remote device configured to estimate a pose of the camera device based on image features detected in the plurality of images; as the additional sets of image features are detected in the other images of the plurality, transmitting the additional sets of image features to the remote device; and receiving, from the remote device, an estimated pose of the camera device. In this example or any other example, the plurality of images of the real-world environment are captured substantially at once. In this example or any other example, each image of the plurality is captured by a different respective camera of the camera device, and the method further comprises transmitting, to the remote device, information indicating a spatial relationship of each of the different respective cameras of the camera device relative to one another. In this example or any other example, the plurality of images of the real-world environment are captured sequentially. In this example or any other example, the method further comprises transmitting, to the remote device, information regarding movements of the camera device between capture of sequential images of the plurality. In this example or any other example, the estimated pose of the camera device is estimated based on identified correspondences between image features transmitted to the remote device and map features in a digital environment map corresponding to the real-world environment. In this example or any other example, each detected image feature includes an indication of a two-dimensional (2D) pixel position at which the image feature was identified in a corresponding image of the real-world environment, and the identified correspondences are between 2D pixel positions of image features transmitted to the remote device and three-dimensional (3D) map positions of map features in the digital environment map. In this example or any other example, the identified correspondences between the 2D pixel positions and 3D map positions are input into a random sample consensus (RANSAC) solver that outputs the estimated pose of the camera device. In this example or any other example, the estimated pose of the camera device is a preliminary estimated pose and is received before the additional sets of image features are detected for every image of the plurality, and the preliminary estimated pose has an associated confidence value proportional to a quantity of image features transmitted to the remote device before the preliminary estimated pose was estimated. In this example or any other example, the method further comprises receiving one or more additional estimated poses after the preliminary estimated pose, the one or more additional estimated poses having been estimated based on more detected image features than the preliminary estimated pose and having correspondingly higher confidence values. In this example or any other example, the method further comprises receiving a final estimated pose having a corresponding confidence value that exceeds a final confidence threshold, and after receiving the final estimated pose, discontinuing transmitting additional sets of image features to the remote device.

In an example, a computing device comprises: one or more cameras; and a logic machine, configured to: capture a plurality of images of a real-world environment via the one or more cameras; detect a first set of image features in a first image of the plurality of images; before additional sets of image features are detected in other images of the plurality, transmit the first set of image features to a remote device configured to estimate a pose of the camera device based on image features detected in the plurality of images; as the additional sets of image features are detected in the other images of the plurality, transmit the additional sets of image features to the remote device; and receive, from the remote device, an estimated pose of the camera device. In this example or any other example, the plurality of images of the real-world environment are captured substantially at once by different respective cameras of the camera device, and the logic machine is further configured to transmit, to the remote device, information indicating a spatial relationship of each of the different respective cameras of the camera device relative to one another. In this example or any other example, the plurality of images of the real-world environment are captured sequentially, and the logic machine is further configured to transmit, to the remote device, information regarding movements of the camera device between capture of sequential images of the plurality. In this example or any other example, the estimated pose of the camera device is estimated based on identified correspondences between image features transmitted to the remote device and map features in a digital environment map corresponding to the real-world environment. In this example or any other example, each detected image feature includes an indication of a two-dimensional (2D) pixel position at which the image feature was identified in a corresponding image of the real-world environment, and the identified correspondences are between 2D pixel positions of image features transmitted to the remote device and three-dimensional (3D) map positions of map features in the digital environment map. In this example or any other example, the estimated pose of the camera device is a preliminary estimated pose and is received before the additional sets of image features are detected for every image of the plurality. In this example or any other example, the preliminary estimated pose has an associated confidence value proportional to a quantity of image features transmitted to the remote device before the preliminary estimated pose was estimated, and the logic machine is further configured to receive one or more additional estimated poses after the preliminary estimated pose, the one or more additional estimated poses having been estimated based on more detected image features than the preliminary estimated pose and having correspondingly higher confidence values. In this example or any other example, the logic machine is further configured to receive a final estimated pose having a corresponding confidence value that exceeds a final confidence threshold, and after receiving the final estimated pose, discontinue transmitting additional sets of image features to the remote device.

In an example, a computing device comprises: a logic machine configured to: receive, from a camera device, a plurality of images of a real-world environment of the camera device captured by one or more cameras of the camera device; as the plurality of images of the real-world environment are received, detect sets of image features in each image of the plurality; as the sets of image features are detected, identify correspondences between detected image features and map features of a digital environment map corresponding to the real-world environment; as the correspondences are identified, progressively output a plurality of estimated poses of the camera device based on the identified correspondences, where each estimated pose has a corresponding confidence value proportional to a quantity of the correspondences identified when each respective estimated pose was output; upon estimating a preliminary pose of the camera device having a corresponding confidence value that exceeds a preliminary confidence threshold, and before detecting the sets of image features for every image of the plurality, report the first pose to the camera device; and upon estimating a second pose of the camera device having a corresponding confidence value that exceeds a final confidence threshold higher than the preliminary confidence threshold, report the second pose to the camera device.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for image-based localization, comprising:
at a camera device, capturing a plurality of images of a real-world environment;
detecting a first set of image features in a first image of the plurality of images;
before additional sets of image features are detected in additional images of the plurality of images, transmitting the first set of image features to a remote device configured to estimate a pose of the camera device;
receiving, from the remote device, a first estimated pose of the camera device, the first estimated pose having been estimated based on the first set of image features detected in the first image of the plurality of images;

as the additional sets of image features are detected in the additional images of the plurality of images, transmitting the additional sets of image features to the remote device; and receiving, from the remote device, a second estimated pose of the camera device, the second estimated pose having been estimated based on multiple sets of image features detected in two or more images of the plurality of images.

2. The method of claim 1, where the plurality of images of the real-world environment are captured substantially at once.

3. The method of claim 2, where each image of the plurality of images is captured by a different respective camera of the camera device, and the method further comprises transmitting, to the remote device, information indicating a spatial relationship of each of the different respective cameras of the camera device relative to one another.

4. The method of claim 1, where the plurality of images of the real-world environment are captured sequentially.

5. The method of claim 4, further comprising transmitting, to the remote device, information regarding movements of the camera device between capture of sequential images of the plurality of images.

6. The method of claim 1, where the first estimated pose of the camera device is estimated based on identified correspondences between image features transmitted to the remote device and map features in a digital environment map corresponding to the real-world environment.

7. The method of claim 6, where each detected image feature includes an indication of a two-dimensional (2D) pixel position at which the image feature was identified in a corresponding image of the real-world environment, and where the identified correspondences are between 2D pixel positions of image features transmitted to the remote device and three-dimensional (3D) map positions of map features in the digital environment map.

8. The method of claim 7, where the identified correspondences between the 2D pixel positions and 3D map positions are input into a random sample consensus (RANSAC) solver that outputs the estimated pose of the camera device.

9. The method of claim 1, where the first estimated pose of the camera device is a preliminary estimated pose and is received before the additional sets of image features are detected for every image of the plurality of images, and the preliminary estimated pose has an associated confidence value proportional to a quantity of image features transmitted to the remote device before the preliminary estimated pose was estimated.

10. The method of claim 9, where the second estimated pose is estimated based on more detected image features than the preliminary estimated pose and has a correspondingly higher confidence value.

11. The method of claim 10, further comprising receiving a final estimated pose having a corresponding confidence value that exceeds a final confidence threshold, and after receiving the final estimated pose, discontinuing transmitting additional sets of image features to the remote device.

12. A camera device, comprising:
one or more cameras; and
a logic machine, configured to:
capture a plurality of images of a real-world environment via the one or more cameras;
detect a first set of image features in a first image of the plurality of images;
before additional sets of image features are detected in additional images of the plurality of images, transmit the first set of image features to a remote device configured to estimate a pose of the camera device;
receive, from the remote device, a preliminary estimated pose of the camera device, the preliminary estimated pose having been estimated based on the first set of image features detected in the first image of the plurality of images, the preliminary estimated pose received before the additional sets of image features are detected for every image of the plurality of images, and the preliminary estimated pose having an associated confidence value that is proportional to a quantity of image features transmitted to the remote device before the preliminary estimated pose was estimated;
as the additional sets of image features are detected in the additional images of the plurality of images, transmit the additional sets of image features to the remote device; and
receive, from the remote device, a second estimated pose of the camera device, the second estimated pose having been estimated based on more detected image features than the preliminary estimated pose, and the second estimated pose having a correspondingly higher confidence value.

13. The camera device of claim 12, where the plurality of images of the real-world environment are captured substantially at once by different respective cameras of the camera device, and the logic machine is further configured to transmit, to the remote device, information indicating a spatial relationship of each of the different respective cameras of the camera device relative to one another.

14. The camera device of claim 12, where the plurality of images of the real-world environment are captured sequentially, and the logic machine is further configured to transmit, to the remote device, information regarding movements of the camera device between capture of sequential images of the plurality of images.

15. The camera device of claim 12, where the first estimated pose of the camera device is estimated based on identified correspondences between image features transmitted to the remote device and map features in a digital environment map corresponding to the real-world environment.

16. The camera device of claim 15, where each detected image feature includes an indication of a two-dimensional (2D) pixel position at which the image feature was identified in a corresponding image of the real-world environment, and where the identified correspondences are between 2D pixel positions of image features transmitted to the remote device and three-dimensional (3D) map positions of map features in the digital environment map.

17. The camera device of claim 12, where the logic machine is further configured to receive a final estimated pose having a corresponding confidence value that exceeds a final confidence threshold, and after receiving the final estimated pose, discontinue transmitting additional sets of image features to the remote device.

18. A computing device, comprising:
a logic machine configured to:
receive, from a camera device, a plurality of images of a real-world environment of the camera device captured by one or more cameras of the camera device;
as the plurality of images of the real-world environment are received, detect sets of image features in each image of the plurality of images;

as the sets of image features are detected, identify correspondences between detected image features and map features of a digital environment map corresponding to the real-world environment;

as the correspondences are identified, progressively output a plurality of estimated poses of the camera device based on the identified correspondences, where each estimated pose has a corresponding confidence value proportional to a quantity of the correspondences identified when each respective estimated pose was output;

upon estimating a preliminary pose of the camera device having a corresponding confidence value that exceeds a preliminary confidence threshold, and before detecting the sets of image features for every image of the plurality of images, report the first pose to the camera device; and upon estimating a second pose of the camera device having a corresponding confidence value that exceeds a final confidence threshold higher than the preliminary confidence threshold, report the second pose to the camera device.

\* \* \* \* \*